United States Patent
Rouverol

[15] 3,654,812
[45] Apr. 11, 1972

[54] BALL-DISK DRIVE

[72] Inventor: William S. Rouverol, Boite Postale, No. 8, 20 Saint Florent, Corse, France

[22] Filed: June 29, 1970

[21] Appl. No.: 50,536

[52] U.S. Cl. ............................................................74/200
[51] Int. Cl. ......................................................F16h 15/38
[58] Field of Search .............................................74/200, 198

[56] References Cited

UNITED STATES PATENTS 2,860,518  11/1958  Andrews..................................74/200
3,257,858  6/1966  Meijer.....................................74/200
3,424,018  1/1969  Alsch......................................74/198

Primary Examiner—Leonard H. Gerin
Attorney—Gordon Wood

[57] ABSTRACT

A construction for a ball-disk drive wherein the bearings for one disk are mounted in a manner insuring perfect self-alignment of the disks and hence equal load on all the cage balls. The cage-positioning mechanism is utilized to apply a variable couple to one of the disk shafts sufficient to exactly offset the cocking moment due to cage eccentricity.

21 Claims, 3 Drawing Figures

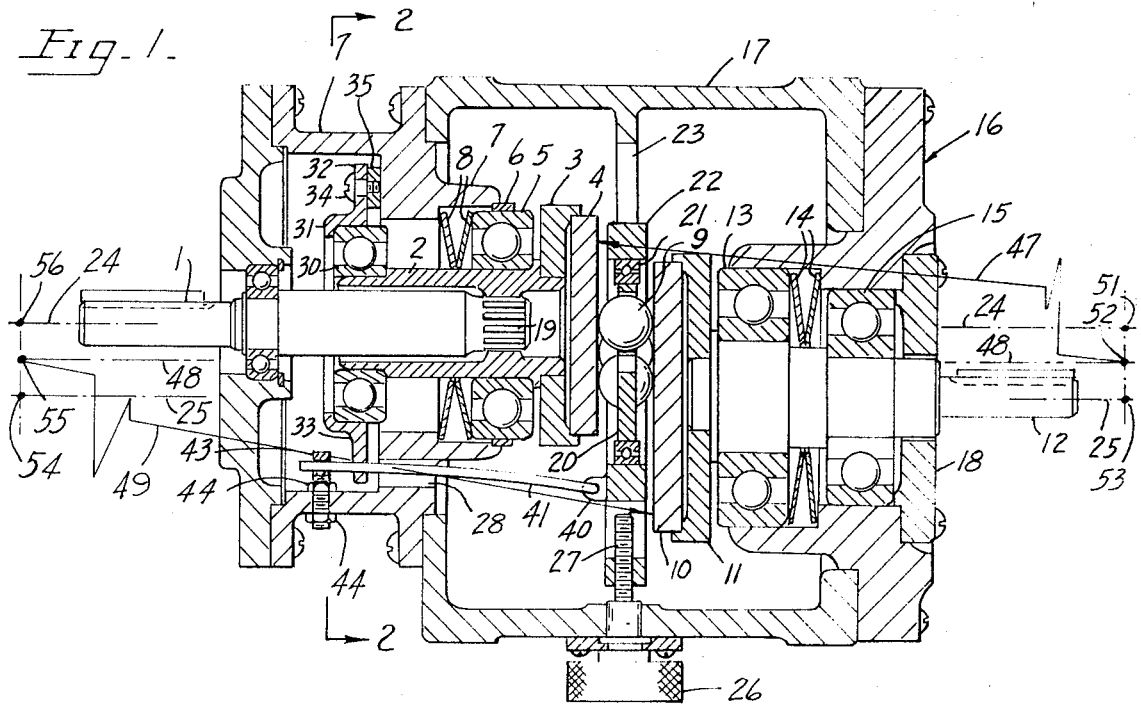
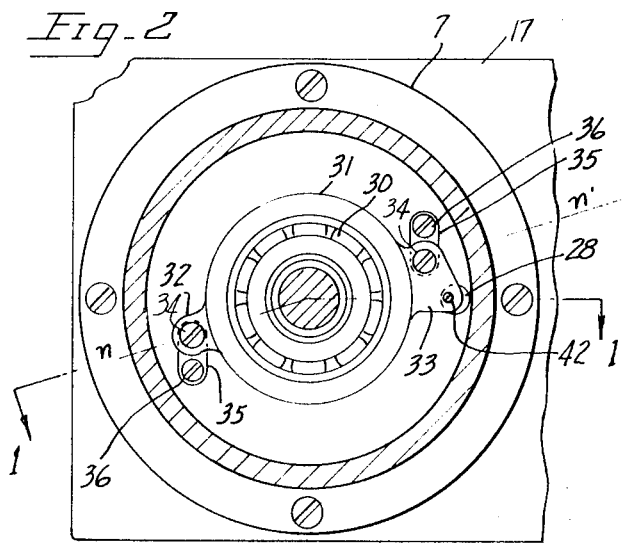
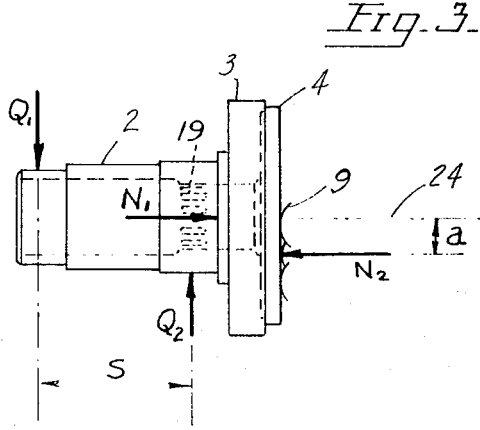

BALL-DISK DRIVE

This invention relates to ball-disk drives of the type disclosed in U.S. Pat. Nos. 2,951,384 and 3,204,476, wherein a cluster of balls mounted in a cage for rotation about a central axis and compressed between a pair of disks transmits a variable angular velocity from one disk to the other. Specifically, the invention relates to mechanical means for insuring that the resultant normal force applied to the cluster of balls always passes through the center of the cluster and hence imposes equal load on all the balls of the cluster regardless of the offset of the cage axis from the axis of the driving disk.

It will be evident from a consideration of the construction of a transmission of the ball-disk type that in order for the cage balls to transmit torque to or from a disk, the central axis of the cage must be offset from the axis of that disk. This offset, taken in conjunction with the large normal force with which the cage balls must be compressed against the disk face in order to maintain traction, make it inevitable that the disk will be cocked to some extent, so that the plane of the disk face will not be exactly perpendicular to the axis of rotation. The amount of cocking will of course be affected by the amount of cage offset, the total cage ball normal load, the rigidity and spacing of the disk shaft bearings and their housing, and the flexural rigidity of the disk face and disk shaft. If the disk bearings are all mounted in a common rigid housing, the cocking of the driving disk can only be equal to, and in the same sense as, that of the driven disk at some mean position of cage offset; at all other cage positions the cocking of the two disks must be different and the faces cannot be precisely parallel.

Because the local deformation of steel balls pressed against a steel plate is very small, even a small amount of nonparallelism between the disk faces results in a large variation in the amount of the normal load borne by the balls on one side of the cage as compared to that borne by the balls on the other side. Such inequalities of ball loading are extremely undesirable in a ball-disk drive, since they result in excessive slip and accelerated disk wear. It can be shown that the tractive slip of a ball-disk drive is governed by the tractive slip of the most lightly loaded balls in the cluster. Specifically, the torque capacity of a ball cluster decreases linearly, from a maximum value if the resultant force on the cluster is at its center, to zero when the resultant force shifts to a distance from the center equal to the outer ball ring radius. Wear problems, however, may be encountered at much smaller eccentricities. Scuffing of the disk surface as a result of gyroscopic effects may cause disk damage even before the resultant force reaches an eccentricity of half the cage radius.

In addition, it will be evident that the maximum allowable normal load that can be applied to a ball cluster is that which develops the full fatigue strength of the disk material under the most heavily loaded balls. The fact that some of the balls of the cage may be lightly loaded does not retard the fretting corrosion of those portions of the disk rolled over by the heavily loaded balls. In terms of power capacity, the total or aggregate normal force that may be imposed on the entire ball cluster must be one that does not overload the most critically loaded balls, and hence a cage in which the balls are unequally loaded will have a much lower torque and power capacity than one in which the balls are equally loaded.

The object of the present invention is therefore to eliminate the excessive slip, scuffing, power loss and disk surface fatigue failure that results from eccentric ball cluster loading, by providing a system of ball cluster loading that imposes equal load on all of the balls at all offset positions. It is a further object of the invention that this equalizing of ball loads be done automatically as the cage position is shifted, and that it be done in such a manner that the magnitude of the aggregate normal force applied to the ball cluster should remain constant at the maximum allowable value.

The means to achieve these and other objects and advantages of the invention will be evident from the drawings as explained in the specification that follows:

FIG. 1 is a horizontal sectional view through the center of the transmission in the plane of the disk and cage axes.

FIG. 2 is a section through the input end of the transmission showing the shiftable mounting for the input shaft outboard bearing.

FIG. 3 is a free-body diagram of the input disk subassembly, showing the resultant axial and transverse forces acting on it in the plane of the disk axes.

In detail, and referring to FIGS. 1 and 2, torque applied to the input shaft 1 is transmitted to a hollow shaft 2 by means of a spline 19 at one end, and thence by means of a brazed connection to the input face-plate holder 3 and from there by friction to the input disk face-plate 4. The spline 19 at the end of the input shaft 1 is centered at the mid-plane of the input disk thrust bearing 5, as is a narrow bearing support ring 6 which is pressed into the input disk bearing cartridge 7. A small amount of radial clearance between the male and female parts of the spline, and between the inner diameter of the bearing support ring 6 and the outer race of the thrust bearing 5, allows the inner race of bearing 5 and the hollow shaft which is pressed into it to rock slightly, as a self-aligning bearing.

A pair of back-to-back Belleville springs 8 interposed between the outer race of the thrust bearing 5 and the input bearing cartridge 7 urge the input disk subassembly 2, 3, 4 forward against the several cage balls 9 with a substantial force called in this specification the "normal load" inasmuch as it acts normal to the disk faces.

The cage balls 9 transmit this normal load to the output disk face-plate 10, which is set in the output face-plate holder 11 brazed to the output shaft 12. Part of the normal load is borne by the output thrust bearing 13, as determined by a second pair of back-to-back Belleville springs 14, which are slightly softer than the springs 8; the balance of the normal load is borne by the output shaft locating bearing 15. Bearings 13 and 15 are mounted in the output bearing cartridge 16, which in turn is mounted in the transmission case 17. The locating bearing 15 is held in place by a cover plate 18.

As in all ball-disk drives, the cage balls 9 are mounted for rotation in annular seats in a cage 20 which is cemented to the inner race of a narrow cage bearing 21. The outer race of the cage bearing 21 is pressed into the cage carriage 22 which is mounted between parallel ways 23 at the top and bottom of the case 17 in such a way that the central axis of the cage 20 lies always in the plane of the input disk axis 24 and the output disk axis 25 and is shiftable therebetween. An adjustment knob 26 and lead screw 27 are provided to shift the cage carriage 22 in a direction transverse to the disk axes 24, 25.

In addition to the input thrust 5 the input disk subassembly 2, 3, 4 is held by an outboard bearing 30 retained in a bearing holder 31 equipped with lugs 32, 33 at the opposite sides thereof (FIG. 2). Each lug 32, 33 has mounted on it by shoulder screws 34 supporting links 35 which are connected to the input bearing cartridge 7 by other shoulder screws 36. The axes of shoulder screws 34 and the input disk axis 24 lie in a common plane n–n' inclined slightly to the plane of the disk axes 24, 25. Supporting links 35 are mounted so that the lines passing through their pivot axes at screws 34 and 36 are parallel when the central axis of the outboard bearing 30 coincides with the input shaft axis 24.

Supporting links 35 and bearing holder 31 thus comprise a Watt straight-line mechanism, which allows the bearing holder 31 to shift slightly in the plane of the disk axes 24, 25 but which prevents movement normal to that plane. Its purpose is to allow the input disk subassembly 2, 3, 4 to cock slightly to accommodate itself to cocking of the output disk subassembly 10, 11, 12 as the ball cluster 9 is shifted transversely in the plane of the disk axes 24, 25.

Referring to FIG. 3 it will be evident that for the input disk subassembly 2, 3, 4 to accommodate itself properly to the cocking of the output disk subassembly 10, 11, 12 the normal load $N_2$ representing the resultant of the several forces exerted by the various cage balls 9 must act at a distance $a$ from the axis of the input disk 24 that is exactly equal to the offset of the axis of the cage 20. The force $N_1$ represents the resultant force exerted on the input disk subassembly 2, 3, 4 by the Belleville springs 8 and does not shift significantly in response to the small amount of cocking that the thrust bearing 5 may be subjected to. Hence in order to control the position of force $N_2$ it is necessary to apply an opposite couple of magnitude $Qs$, where $s$ is the axial distance between bearings 5 and 30 and Q is a force of the following magnitude:

$$Q = Na/s \text{ where } Q=Q_1=Q_2 \text{ and } N=N_1=N_2 \qquad 1.$$

Inasmuch as the Belleville spring force N and the bearing spacing $s$ are constant, equation (1) shows that the magnitude of the force Q must be linearly proportional to the cage offset $a$. For this reason the cage positioning mechanism is used to develop the desired force Q and the construction of FIG. 1 shows one method of doing this. Various mechanisms may be devised to apply either $Q_1$ or $Q_2$ only one of which needs to be imposed since the other one develops automatically as a reactive force.

The cage carriage 22 is equipped with a small lug 40 substantially in the plane of the disk axes 24, 25. Through a hole in this lug 40 projects an L-shaped bend at the end of a spring steel rod 41. The other end of rod 41 passes through a large hole 28 in bearing cartridge 7 and is threaded through a small hole 42 (FIG. 2) in the larger lug 33 of bearing holder 31. Beyond this it is threaded through another small hole in the end of a fulcrum pin 43. The fulcrum pin 43 is held in place in a threaded hole through the bearing cartridge 7 by interior and exterior nuts 44 so that it can be set to eliminate all bending of rod 41 when the cage carriage 22 has positioned the cage 20 so that its axis is coaxial with the input disk axis 24.

The above disclosed mechanism will give a reasonably accurate positioning of the normal force $N_2$ at the cage center provided the rod 41 has the proper diameter. The equations for selecting this diameter are as follows:

$$\Delta = \Delta \qquad 3. \; 3/3EI$$

This is the standard expression for the deflection $\Delta$ of a cantilever beam of length $l$, plane movement of inertia I and modulus of elasticity E. This equation is of the general form.

$$P = k\Delta \qquad 3.$$

which applies to any spring member of spring constant $k$. In this case $$k = 3EI/l^3 \qquad 4.$$

P is the force exerted on the spring rod 41 by the cage carriage 22 as it is shifted away from the input disk axis 24 by a distance $$a = \Delta \qquad 5.$$

In order to keep the spring resistance $k\Delta$ small enough not to impede the shifting of the cage carriage 22 it will generally be desirable to use a fairly large mechanical advantage in applying the force Q to the bearing holder 31. In the construction of FIG. 1 the spring rod 41 deflection force P is in effect multiplied by the ratio of the distance $l$ from the fulcrum pin 43 to the cage carriage lug 40 divided by the distance $c$ from the fulcrum pin 43 to the hole 42 in the bearing holder 31. Hence $$Q = l/c \, P \qquad 6.$$

Noting that the plane movement of inertia of a round section of diameter $d$ is approximately $$I \approx 0.05 \, d^4 \qquad 7.$$

equations (1) through (6) may be combined to obtain $d = Ncl^2 10.15 \, Es$ \qquad 8.

It will be evident that equation (8) is derived without consideration of the fact that the self-aligning of the input disk subassembly 2, 3, 4 causes the position of the hole 42 in the bearing holder 31 to shift slightly depending on the amount of offset of the cage 20 from the input disk axis 24. To accommodate this effect it is desirable to use a slightly stiffer spring constant $k$ than is indicated by equation (4), i.e. the diameter of the spring rod 41 should be 2 to 4 percent larger than that indicated by equation (8).

This small inaccuracy may be almost completely eliminated by grinding a slight spherical dish into the working surfaces of the face plates 4, 10 as indicated in FIG. 1. The face plates 4, 10 can of course be made so thin that they dish enough merely under the heavy normal load on the cluster balls 9 to more or less compensate for disk cocking. However the form taken by elastically dished face plates is not spherical but paraboloid, and balls rolling on this type of surface tend to induce vibrations that accelerate wear and promote surface fatigue.

The optimum radius 47 to grind into face plate 4 is one which will have a tangent plane at the axis of the cage 48 that is parallel to the corresponding tangent plane for face plate 10 at all positions of cage axis 48. In fabrication the center of radius 47 is at a point 51 on the projected axis 24 of the input disk subassembly 2, 3, 4 at a considerable distance from the face plate 4 surface, usually in the range of 30 to 100 face plate diameters, depending on the stiffness of the shaft 2 and the spacing and mounting rigidity of the support bearings 5, 30. In the assembled transmission the center of the spherical radius 47 shifts from point 51 to point 52 as the cage 20 axis is moved from a position colinear with axis 24 to any intermediate position 48 such as shown in FIG. 1. If the cage 20 could be moved to the center of the output disk subassembly 10, 11, 12, the center of the radius should shift to point 53 on axis 25.

For the output disk face plate 10, the radius 49 of the spherical dish has a center which moves similarly, from point 54 on axis 25 to point 55, and thence to point 56 on axis 24, depending on the displacement of the cage 20 axis 48 from the axis 25 of the output disk subassembly 10, 11, 12. The radii 47 and 49 should be equal only if the disk shafts 2, 12 and their mountings are equally rigid. This will not normally be the case. Each radius should be equal to the following:

$$R = K/\Phi \qquad 9.$$

where K is the distance between axis 24 and axis 25, and $\Phi$ is the angle made by the disk face plate (4 or 10) when the normal load on the ball cluster 9 is eccentric by the distance K. The angle $\Phi$ may be found approximately by calculation or preferably from a standpoint of accuracy by dial gauge indicator measurements of an actual assembly of one disk subassembly in place in the transmission case.

The simplest and most accurate method of grinding a very shallow spherical disk of radius R into a face plate surface is to rotate it against the edge of a standard cylindrical grinding wheel, with the edge of the wheel at the exact center of the face plate and the axis of the wheel making a small angle $\Phi$ with the axis of the face plate, equal to:

$$\Phi = r/R \qquad 10.$$

where $r$ is the radius of the grinding wheel.

Several points should be noted in connection with the use of spherically ground disk faces: (a) It may be shown mathematically that the balls move in pure rolling despite the spherical surfaces; (b) a spherical surface on the driven disk may be used against a flat surface on the driving disk, provided the stiffness against cocking of the driving disk is more than twice that of the driven disk; (c) if more than one ring of balls is used in the cage, the inner balls must be a few thousandths of an inch larger than the outer balls; (d) if manufacturing tolerances are quite close, at least 90 percent of the potential torque and power capacity of a transmission unit may be realized by the use of either spherically dished disks or flat disks of which one is self-aligning and laterally loaded, but to achieve optimum torque and power capacity, both features must be used.

A number of modifications to the embodiment shown in FIG. 1 and FIG. 2 will be obvious to one skilled in the art and are encompassed in the concept of the invention. These modifications include, but are not restricted to, the following:

The Watt straight-line mechanism for the support of the outboard bearing 30 may be replaced by several kinds of slotted housings that provide support normal to the plane of the disk axes 24, 25 but allow a slight amount of movement within said plane. All of these alternatives have more frictional resistance than the Watt linkage, but in transmissions that evidence dynamic instability at some particular speed ratio this increased friction may be desirable as a means of obtaining greater-than-critical damping.

The input thrust bearing 5 may be supported by a single Belleville spring projecting radially outward from the outer race. This construction provides considerably less frictional resistance to self-alignment than the configuration shown in FIG. 1 so that to prevent any possibility of dynamic instability it is preferable to use such a mounting in combination with a mounting for outboard bearing 30 that incorporates more friction than the Watt linkage.

The slender spring rod 41 may be replaced by a stiff rod of larger diameter if a helical spring of the prior spring constant $k$ is interposed between its end and the lug 40 on the cage carriage 22. This thicker rod has considerably more inertia than the thin rod and will effect a considerable lowering of the natural frequency of vibration of the input disk subassembly 2, 3, 4.

The spline 19 at the end of the input shaft 1 may be replaced by several types of small plastic or hard elastomer couplings that center the inboard end of the input shaft at least as well as the spline 19 and also allow a slight amount of axial misalignment to accommodate the slight cocking of the input disk subassembly 2, 3, 4.

The transverse load Q could be applied to any of the other three shaft support bearings 5, 13, 15 with appropriate change of the linkage connecting them to the cage carriage 22, either with or without a mechanical advantage such as that disclosed in FIG. 1 and specified in equation (6).

It will further be evident from a consideration of the general characteristics of levers that numerous possibilities exist for applying the force Q. All levers include an applied force, a produced force (such as Q), lever arms for both applied and produced forces, and a fulcrum. The produced force may be caused to vary by (a) changing the applied force, as in the embodiment of FIG. 1. It may also be varied by (b) changing both lever arms by shifting the fulcrum or (c) varying one lever arm as by changing the position of the applied force relative to the fulcrum. Since it is possible to use any one of these three methods of varying the force Q, and since the two disks are each supported by two bearings, there are obviously 12 possible configurations that may be employed for applying the force Q so that it varies directly with the cage offset. The shifting fulcrum is readily achieved by employing a cam-roll bearing mounted on the cage carriage 22 or a pair of rollers interposed between the lever and the transmission housing 17; changing the position of the applied force can be effected by mounting a spring-loaded roller on the cage carriage 22. Both these constructions avoid imposing resistance to shifting the cage, but they are somewhat more costly to construct than the configuration of FIG. 1.

It will also be evident that there are means of applying a couple to a rotating disk other than the one disclosed in FIG. 1, as by rollers bearing a against the back, edge or face of one or both disks. It is envisaged that these modified configurations fall within the concept of the present invention insofar as they embody the essential features of the invention as defined in the claims. The specific description given above of the preferred form of the invention should not be taken as restrictive as it will be apparent from the preceding paragraphs that various modifications in design may be resorted to by those skilled in the art without departing from the scope of the following claims.

I claim:

1. In a power transmission,
a first rotatable member having at least one concave spherical surface,
bearing means mounting said first rotatable member,
a second rotatable member having at least one substantially smooth surface, all radial profiles of which move within said surface during rotation of said member,
bearing means mounting said second rotatable member for rotation about an axis constrained to remain substantially parallel to the axis of rotation of said first rotatable member and so located that said two surfaces are opposed and overlapping,
a plurality of rolling elements frictionally engaged by said two surfaces,
a third rotatable member constraining said rolling elements to move in circular paths about an axis lying substantially in the plane of the axes of rotation of said first two members,
shifting means to vary the position of the axis of rotation of at least one of said three members within said plane of the axes of said first two members.

2. A power transmission according to claim 1 wherein the bearing means mounting one of said first two rotatable members includes a first bearing which is self-aligning in the plane of said axes and a second bearing which is slightly shiftable in a direction transverse to said axes.

3. A power transmission according to claim 2 wherein loading means is provided to apply a force to said second bearing in a direction transverse to said axes.

4. A power transmission according to claim 3 wherein said loading means incorporates spring means with a substantially linear deflection characteristic.

5. A power transmission according to claim 3, wherein the force applied by said loading means is varied by the movement of said shifting means.

6. A power transmission according to claim 5, wherein the force applied by said loading means increases linearly from zero substantially in proportion to the distance between the axes of one of said first two members and said third member.

7. A power transmission according to claim 3 wherein the force applied by said loading means is multiplied by a mechanical linkage.

8. A power transmission according to claim 2, wherein said rotatable member mounted in self-aligning bearing means has a hollow shaft inserted into which is an auxiliary drive shaft with its closest radial fit substantially in a plane containing the center of self-alignments of said bearing means.

9. in a power transmission,
a first rotatable member having a substantially flat surface normal to its axis of rotation,
fixed bearing means mounting said first rotatable member,
bearing means mounting said second rotatable member for rotation about an axis substantially parallel to the axis of said first rotatable member and so located that said two surfaces are opposed and overlapping,
a plurality of rolling elements frictionally engaged by said two surfaces,
a third rotatable member constraining said rolling elements to move in circular paths about an axis lying substantially in the plane of the axes of rotation of said first two members,
shifting means to vary the position of the axis of rotation of at least one of said three members within said plane of the axes of said first two members,
loading means to apply a force to said first rotatable member through one of said bearing means in a direction transverse to the axis of said third rotatable member.

10. A power transmission according to claim 9 wherein loading means is provided to apply a force to said second bearing in a direction transverse to said axes.

11. A power transmission according to claim 10 wherein said loading means incorporates spring means with a substantially linear deflection characteristic.

12. A power transmission according to claim 11 wherein the force applied by said loading means is varied by the movement of said shifting means.

13. A power transmission according to claim 12 wherein the force applied by said loading means increases linearly from zero substantially in proportion to the distance between the axes of one of said first two members and said third member.

14. A power transmission according to claim 10 wherein the force applied by said loading means is multiplied by a mechanical linkage.

15. A power transmission according to claim 9 wherein said rotatable member mounted in self-aligning bearing means has a hollow shaft inserted into which is an auxiliary drive shaft with its closest radial fit substantially in a plane containing the center of self-alignments of said bearing means.

16. In a power transmission,
a first rotatable member having a substantially flat surface normal to its axis of rotation,
bearing means mounting said first rotatable member,
a second rotatable member having a substantially flat surface normal to its axis of rotation,
bearing means mounting said second rotatable member for rotation about an axis substantially parallel to the axis of said first rotatable member and so located that said two surfaces are opposed and overlapping,
a plurality of rolling elements frictionally engaged by said two surfaces,
a third rotatable member constraining said rolling elements to move in circular paths about an axis lying substantially in the plane of the axes of rotation of said first two members,
shifting means to vary the position of the axis of rotation of at least one of said three members within said plane of the axes of said first two members,
loading means to apply a force to said first rotatable member through one of said bearing means in a direction transverse to the axis of said third rotatable member.

17. A power transmission according to claim 16 wherein the bearing means mounting one of said first two members is self-aligning.

18. A power transmission according to claim 17 wherein said rotatable member mounted in self-aligning bearing means has a hollow shaft inserted into which is an auxiliary drive shaft with its closest radial fit substantially in a plane containing the center of self-alignments of said bearing means.

19. A power transmission according to claim 16 wherein the force applied by said loading means is varied by the movement of said shifting means.

20. A power transmission according to claim 19 wherein the force applied by said loading means increases linearly from zero substantially in proportion to the distance between the axes of one of said first two members and said third member.

21. A power transmission according to claim 16 wherein the force applied by said loading means is multiplied by a mechanical linkage.

\* \* \* \* \*